(12) United States Patent
Li et al.

(10) Patent No.: US 11,291,069 B2
(45) Date of Patent: Mar. 29, 2022

(54) CONNECTION MANAGEMENT METHOD, USER EQUIPMENT, CORE NETWORK ENTITY, AND SYSTEM

(71) Applicant: HUAWEI TECHNOLOGIES CO., LTD., Guangdong (CN)

(72) Inventors: Xiaojuan Li, Beijing (CN); Haorui Yang, Shenzhen (CN); Hui Jin, Beijing (CN); Guowei Ouyang, Beijing (CN); Yue He, Beijing (CN); Fenghui Dou, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/649,377

(22) PCT Filed: Sep. 21, 2017

(86) PCT No.: PCT/CN2017/102808
§ 371 (c)(1),
(2) Date: Mar. 20, 2020

(87) PCT Pub. No.: WO2019/056279
PCT Pub. Date: Mar. 28, 2019

(65) Prior Publication Data
US 2020/0275515 A1 Aug. 27, 2020

(51) Int. Cl.
*H04W 76/27* (2018.01)
*H04W 76/30* (2018.01)

(52) U.S. Cl.
CPC .................. *H04W 76/27* (2018.02)

(58) Field of Classification Search
CPC ..... H04W 76/27; H04W 76/30; H04W 76/16; H04W 4/08; H04W 40/24; H04B 7/18539
See application file for complete search history.

(56) References Cited

U.S. PATENT DOCUMENTS

2015/0181470 A1\* 6/2015 Chai ..................... H04W 36/08
455/438
2016/0088535 A1\* 3/2016 Suemitsu .............. H04W 16/32
455/436
(Continued)

FOREIGN PATENT DOCUMENTS

CN 102238664 A 11/2011
CN 106658758 A 5/2017
(Continued)

OTHER PUBLICATIONS

XP051217037 S2-170917 Qualcomm Incorporated,"UE mobility while in RRC inactive mode-SA2 aspects",SA WG2 Meeting #119,13 Feb. 17, 2017. Dubrovnik. Croatia,total 6 pages.
(Continued)

*Primary Examiner* — Andrew Wendell
(74) *Attorney, Agent, or Firm* — Womble Bond Dickinson (US) LLP

(57) ABSTRACT

A connection management method includes: accessing, by UE, a network using a first base station, where the UE is in an RRC inactive state; accessing, by the UE, a network using a second base station, where the second base station does not support the RRC inactive state; and sending, by the UE, a first request message to a first core network entity using the second base station, so that the first core network entity releases a connection to the first base station based on the first request message.

18 Claims, 9 Drawing Sheets

(56) References Cited

U.S. PATENT DOCUMENTS

| | | | |
|---|---|---|---|
| 2016/0309379 A1 | 10/2016 | Pelletier et al. | |
| 2018/0041927 A1* | 2/2018 | Raval | H04W 24/02 |
| 2018/0049244 A1* | 2/2018 | Lee | H04W 76/27 |
| 2018/0139778 A1* | 5/2018 | Chou | H04W 74/04 |
| 2018/0176834 A1* | 6/2018 | Wei | H04W 36/0016 |
| 2018/0234894 A1 | 8/2018 | Jiang | |
| 2018/0255452 A1* | 9/2018 | Wu | H04W 8/24 |
| 2019/0246445 A1* | 8/2019 | Centonza | H04W 76/27 |
| 2020/0015112 A1* | 1/2020 | Kim | H04W 48/02 |
| 2020/0045591 A1* | 2/2020 | Yokoyama | H04W 48/20 |

FOREIGN PATENT DOCUMENTS

| | | |
|---|---|---|
| CN | 109548109 A | 3/2019 |
| EP | 3672327 A1 | 6/2020 |

OTHER PUBLICATIONS

XP051245849 R3-171130 LG Electronics Inc.,"Discussion on inter-gNB mobility in RRC_INACTIVE",3GPP TSG-RAN WG3 Meeting #95bis,Spokane, Washington, USA, Apr. 3-7, 2017,total 4 pages.

S2-175556 Huawei, HiSilicon,"TS 23.502: Fallback to CN paging Upon RAN Paging Failure",SA WG2 Meeting #122 bis,Aug. 21-25, 2017, Sophia Antipolis, France,total 6 pages.

S2-176773 Nokia et al.,"23.501 5.3 and 5.4: AMF UE state information terminology update",SA WG2 Meeting #122E,Sep. 11-15, 2017, Elbonia,total 11 pages.

3GPP TS 23.501 V1.3.0 (Sep. 2017),3rd Generation Partnership Project;Technical Specification Group Services and System Aspects-;System Architecture for the 5G System;Stage 2(Release 15),dated Sep. 9, 2017,total 174 pages.

* cited by examiner

CONNECTION MANAGEMENT METHOD, USER EQUIPMENT, CORE NETWORK ENTITY, AND SYSTEM

CROSS-REFERENCE TO RELATED APPLICATIONS

This application is a National Stage of International Application No. PCT/CN2017/102808, filed on Sep. 21, 2017, which is hereby incorporated by reference in its entirety.

TECHNICAL FIELD

This application relates to a field of wireless communications technologies, and in particular, to a connection management method, user equipment, a core network entity, and a system.

BACKGROUND

A radio resource control (RRC) inactive state refers to that a state of a connection between user equipment (UE) and a base station is an idle state, and that a state of a connection between the base station and a core network is a connected state. When the UE is in the RRC inactive state, a radio access network (RAN) is required to have a function of supporting the RRC inactive state to implement paging, reachability management, and the like for the UE. However, in a fifth generation mobile communication technology (5G) network, a base station may not support the RRC inactive state. For example, some 4G base stations accessing a 5G core network do not support the RRC inactive state. If UE accesses a cell of a base station that does not support the RRC inactive state, that is, when the UE in the RRC inactive state moves out from a radio access network notification area (RNA) that is within coverage of a base station supporting the RRC inactive state and that the UE camps on, and move to and camps on a base station that does not support the RRC inactive state, the UE cannot communicate with the base station that does not support the RRC inactive state. If the UE in the RRC inactive state needs to communicate with a network, the UE can only send an RRC resume request. However, a RAN that does not support the RRC inactive state cannot identify the request, and consequently the UE cannot communicate with a current base station.

SUMMARY

Embodiments of the present invention provide a connection management method, user equipment, a core network entity, and a system, so that UE in an RRC inactive state can communicate with a base station that does not support the RRC inactive state.

According to an aspect, an embodiment of the present invention provides a connection management method, including: accessing, by user equipment UE, a network by using a first base station, where the UE is in a radio resource connection inactive state RRC inactive state; accessing, by the UE, a network by using a second base station, where the second base station does not support the RRC inactive state; and sending, by the UE, a first request message to a first core network entity by using the second base station. The first core network entity connects to the first base station, and the first core network entity receives the first request message sent by the UE by using the second base station, and may release the connection to the first base station based on the first request message. Alternatively, the UE may send the first request message to the first core network entity by using the second base station. Further, the first core network entity may send a second request message to a second core network entity, so that the second core network entity may receive the second request message sent by the first core network entity, and the second core network entity may release a connection to the first base station based on the second request message.

The first base station may be a base station corresponding to a network, such as a radio access network (RAN), accessed by the UE before the UE moves, that is, a base station accessed by the UE before the UE moves. The second base station may be a base station corresponding to a network, such as a RAN, accessed by the UE after the UE moves, that is, a base station accessed by the UE after the UE moves, and the second base station does not support the RRC inactive state. For example, the first base station may be a 5G base station, and the second base station may be a 4G base station that does not support the RRC inactive state or may be a 5G base station that does not support the RRC inactive state, or the like. Examples are not listed herein. Further, the UE supports the RRC inactive state, and the UE may be in the RRC inactive state when communicating with the first base station. Therefore, communication can be implemented between the UE in the RRC inactive state and the base station that does not support the RRC inactive state.

In one embodiment, the UE may receive a broadcast message sent by the second base station, and determine, based on the broadcast message, whether the second base station supports the RRC inactive state, to trigger to send a request message to the first core network entity when determining that the second base station does not support the RRC inactive state.

In one embodiment, the first core network entity may be a core network entity of a network accessed by the second base station, and the second core network entity may be a core network entity of a network accessed by the first base station. The core network entity may be an access and mobility management function (AMF) entity, a mobility management entity (MME), a 3G core network entity such as a serving general packet radio service (GPRS), serving GPRS support node (SGSN), or a core network entity of another communications system. This is not limited in this application. For example, when the first base station is a 5G base station, and the second base station is a 4G base station, the first core network entity may be an MME, and the second core network entity may be an AMF. For another example, when both the first base station and the second base station are 4G base stations, both the first core network entity and the second core network entity may be AMFs, and the first core network entity and the second core network entity may be a same AMF, or may be different AMFs.

In one embodiment, before sending the first request message to the first core network entity by using the second base station, the UE may switch a state of the UE from the RRC inactive state to an idle state idle state.

In one embodiment, the first request message may include indication information, and the indication information is used to instruct the UE to switch from the RRC inactive state to the idle state idle state.

In one embodiment, the first request message and/or the second request message may be further used to instruct the core network entity to perform a protocol data unit (PDU) session deactivation procedure. Further, after receiving the first request message, the first core network entity may further perform the PDU session deactivation procedure, including releasing a connection to a session management function (SMF) entity, and the like. Alternatively, after the second core network entity receives the second request message sent by the first core network entity, the second core network entity may further perform the PDU session deactivation procedure.

In one embodiment, the first request message may be a location update request such as a tracking area update (TAU) request, an attach request attach request, a registration request registration request, or a service request service request, instead of an RRC resume request.

In one embodiment, the second request message may be a message between core networks, such as a context request context request or a context transfer context transfer message.

In one embodiment, the first request message may further include UE capability information, and the UE capability information indicates that the UE supports the RRC inactive state. That is, the first request message may further carry capability information indicating that the UE supports the RRC inactive state.

In one embodiment, the first base station supports the RRC inactive state, that is, the first base station may be a base station that supports the RRC inactive state.

According to another aspect, an embodiment of the present invention provides user equipment. The user equipment has a function of implementing an action of the user equipment UE in the foregoing method example. The function may be implemented by hardware, or implemented by hardware executing corresponding software. The hardware or the software includes one or more units or modules corresponding to the foregoing function.

In one embodiment, a structure of the user equipment includes a communications unit and a processing unit. The processing unit is configured to support the user equipment in performing a corresponding function in the foregoing method. The communications unit is configured to support communication between the user equipment and another device. The user equipment may further include a storage unit configured to couple to the processing unit, and the storage unit stores a program instruction (operating instruction) and data that are necessary for the user equipment. In an example, the processing unit may be a processor, the communications unit may be a transceiver, and the storage unit may be a memory.

According to still another aspect, an embodiment of the present invention provides a core network entity. The core network entity specifically has a function of implementing an action of the core network entity such as the first core network entity or the second core network entity in the foregoing method example. The function may be implemented by hardware, or implemented by hardware executing corresponding software. The hardware or the software includes one or more units or modules corresponding to the foregoing function.

In one embodiment, a structure of the core network entity includes a communications unit and a processing unit. The processing unit is configured to support the core network entity in performing a corresponding function in the foregoing method. The communications unit is configured to support communication between the core network entity and another device. The core network entity may further include a storage unit configured to couple to the processing unit, and the storage unit stores a program instruction (an operating instruction) and data that are necessary for the core network entity. In an example, the processing unit may be a processor, the communications unit may be a transceiver, and the storage unit may be a memory.

According to still another aspect, an embodiment of the present invention provides a communications system. The communications system includes the user equipment and/or the core network entity such as the first core network entity or the second core network entity in the foregoing aspects. In another embodiment, the system may further include another device such as the first base station, the second base station, and the SMF that interacts with the user equipment or the core network entity in the solution provided in the embodiments of the present invention.

According to still another aspect, an embodiment of the present invention provides a computer storage medium. The computer storage medium is configured to store a computer software instruction used by the foregoing user equipment, and the computer software instruction includes a program designed for executing the foregoing aspects.

According to still another aspect, an embodiment of the present invention provides a computer storage medium. The computer storage medium is configured to store a computer software instruction used by the foregoing core network entity such as the first core network entity or the second core network entity, and the computer software instruction includes a program designed for executing the foregoing aspects.

According to still another aspect, an embodiment of the present invention provides a computer program including an instruction. When the computer program is run on a computer, the computer is enabled to perform the methods in the foregoing aspects.

According to still another aspect, an embodiment of this application further provides a computer program product including an instruction. When the computer program product is run on a computer, the computer is enabled to perform the methods in the foregoing aspects.

According to still another aspect, an embodiment of this application provides a chip system. The chip system includes a processor, configured to support user equipment in implementing the function in the foregoing aspects, such as generating or processing data and/or information in the foregoing methods. In one embodiment, the chip system further includes a memory, configured to store a program instruction and data that are necessary for the user equipment. The chip system may include a chip, or may include a chip and another discrete device.

According to still another aspect, an embodiment of this application provides a chip system. The chip system includes a processor, configured to support a core network entity such as a first core network entity or a second core network entity in implementing the function in the foregoing aspects, such as receiving or processing data and/or information in the foregoing methods. In one embodiment, the chip system further includes a memory, configured to store a program instruction and data that are necessary for the core network entity. The chip system may include a chip, or may include a chip and another discrete device.

According to the technical solution claimed in this application, the UE may access the network by using the first base station, and in this case, the UE may be in the RRC inactive state. Further, the UE may also access the network by using the second base station. For example, if the UE moves from a cell in which the first base station is located to a cell in which the second base station is located, the UE may send the request message to the core network entity after determining that the second base station does not support the RRC inactive state, so that the core network entity can release the connection to the first base station after receiving the request message. In this way, communication is implemented between the UE in the RRC inactive state and the base station that does not support the RRC inactive state.

DESCRIPTION OF EMBODIMENTS

The following describes the embodiments of the present invention with reference to the accompanying drawings in the embodiments of the present invention.

It should be understood that the technical solution of this application may be specifically applied to various communications networks, for example, a global system for mobile communications (GSM), a code division multiple access (CDMA), a wideband code division multiple access (WCDMA), a time division-synchronous code division multiple access (TD-SCDMA), a universal mobile telecommunications system (UMTS), and a long term evolution (LTE). With continuous development of communications technologies, the technical solution in this application may be further applied to a future network, for example, a 5G network, also referred to as a new radio (NR) network, or the technical solution may be applied to a D2D (device to device) network, an M2M (machine to machine) network, or the like.

A core network entity in this application may be an MME, an AMF, and an SGSN, or the like. This is not limited in this application.

In this application, user equipment is a device with a communication function, and may be referred to as a terminal. The user equipment may be a device with a wireless communication function such as a handheld device, a vehicle-mounted device, a wearable device, a computing device, or another processing device connected to a wireless modem. The user equipment may have different names in different networks, for example, a terminal, UE, a mobile station, a subscriber unit, a station, a cellular phone, a personal digital assistant, a wireless modem, a wireless communications device, a handheld device, a laptop computer, a cordless phone, or a wireless local loop station. The user equipment may be a wireless terminal or a wired terminal. The wireless terminal may be a device that provides a user with voice and/or data connectivity, a handheld device with a wireless connection function, or another processing device connected to a wireless modem. The wireless terminal may communicate with one or more core networks by using a radio access network (RAN).

In this application, a base station may also be referred to as a base station device, and the base station device is a device that is deployed in a radio access network to provide a wireless communication function. The base station may have different names in different radio access systems. For example, the base station in the universal mobile telecommunications system UMTS network is referred to as a NodeB (NodeB), an evolved NodeB (eNB or eNodeB) in an LTE network, a transmission reception point (TRP) in a future 5G system, a network node, or a g-NodeB (gNB), or the like, which are not listed herein.

Figure 1:
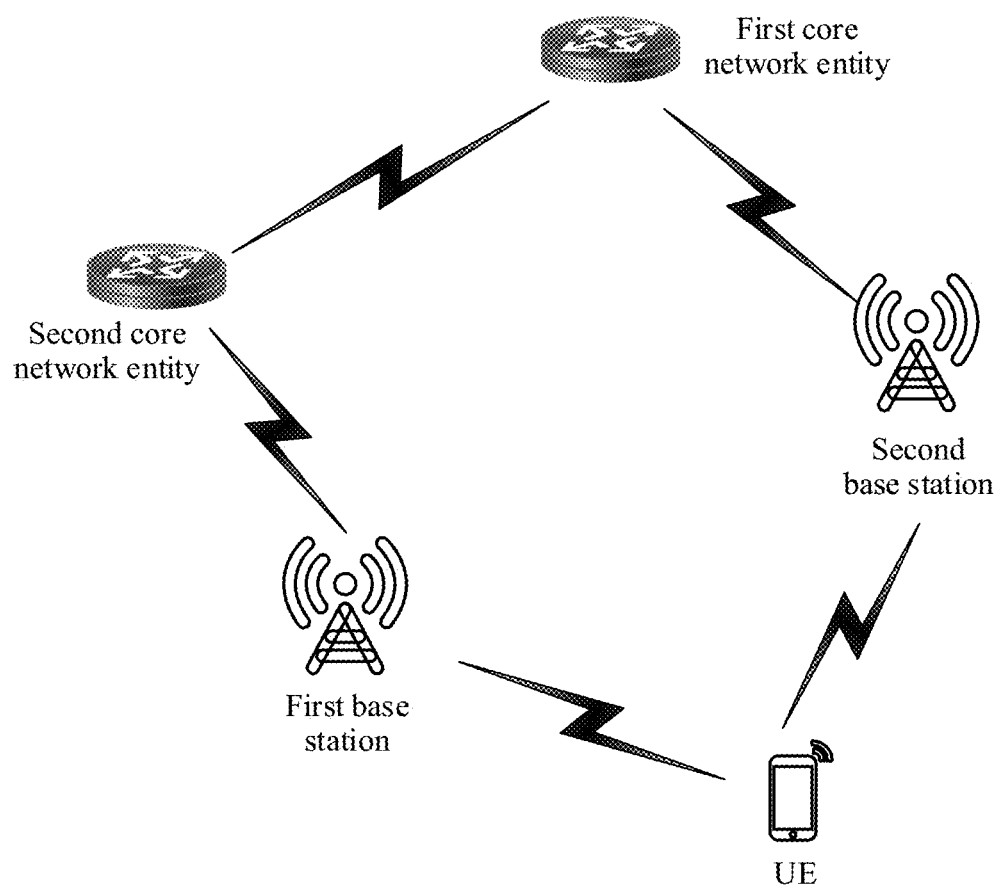
FIG. 1 is a diagram of an application scenario of a communications system according to an embodiment of the present invention.

The following describes an application scenario of this application. FIG. 1 is an architectural diagram of a communications system according to an embodiment of the present invention. Specifically, as shown in FIG. 1, the communications system may include UE, a first base station, a second base station, and a first core network entity. In one embodiment, the system further includes a second core network entity. The UE supports an RRC inactive state, and the UE may be in the RRC inactive state when communicating with the first base station. The first base station may be a base station corresponding to a network such as a RAN accessed by the UE before the UE moves. The second base station may be a base station corresponding to a network such as a RAN accessed by the UE after the UE moves. The first base station may support the RRC inactive state or may not support the RRC inactive state, and the second base station does not support the RRC inactive state. The first core network entity may be a core network entity of a network accessed by the second base station, and the second core network entity may be a core network entity of a network accessed by the first base station. In one embodiment, the core network entity corresponding to the first base station, that is, the second core network entity, may be the same as or different from the core network entity corresponding to the second base station, that is, the first core network entity. Further, In one embodiment, the communications system further includes an SMF, a user port function (UPF) entity (not shown in the figure), or the like.

Because an RRC resume request sent by the UE in the RRC inactive state cannot be identified by a RAN (a base station, for example, the foregoing second base station) that does not support the RRC inactive state, the UE in the RRC inactive state cannot communicate with the RAN that does not support the RRC inactive state. Therefore, in this application, the core network entity such as the first core network entity or the second core network entity can be instructed, by sending a request message such as a service request or a registration request to the RAN that does not support the RRC inactive state, to release a connection to the first base station. In this way, communication is implemented between the UE in the RRC inactive state and the RAN that does not support the RRC inactive state.

This application discloses a connection management method, user equipment, a core network entity, and a system, so that communication can be implemented between UE in an RRC inactive state and a RAN that does not support the RRC inactive state. Details are separately described as follows.

Figure 2:
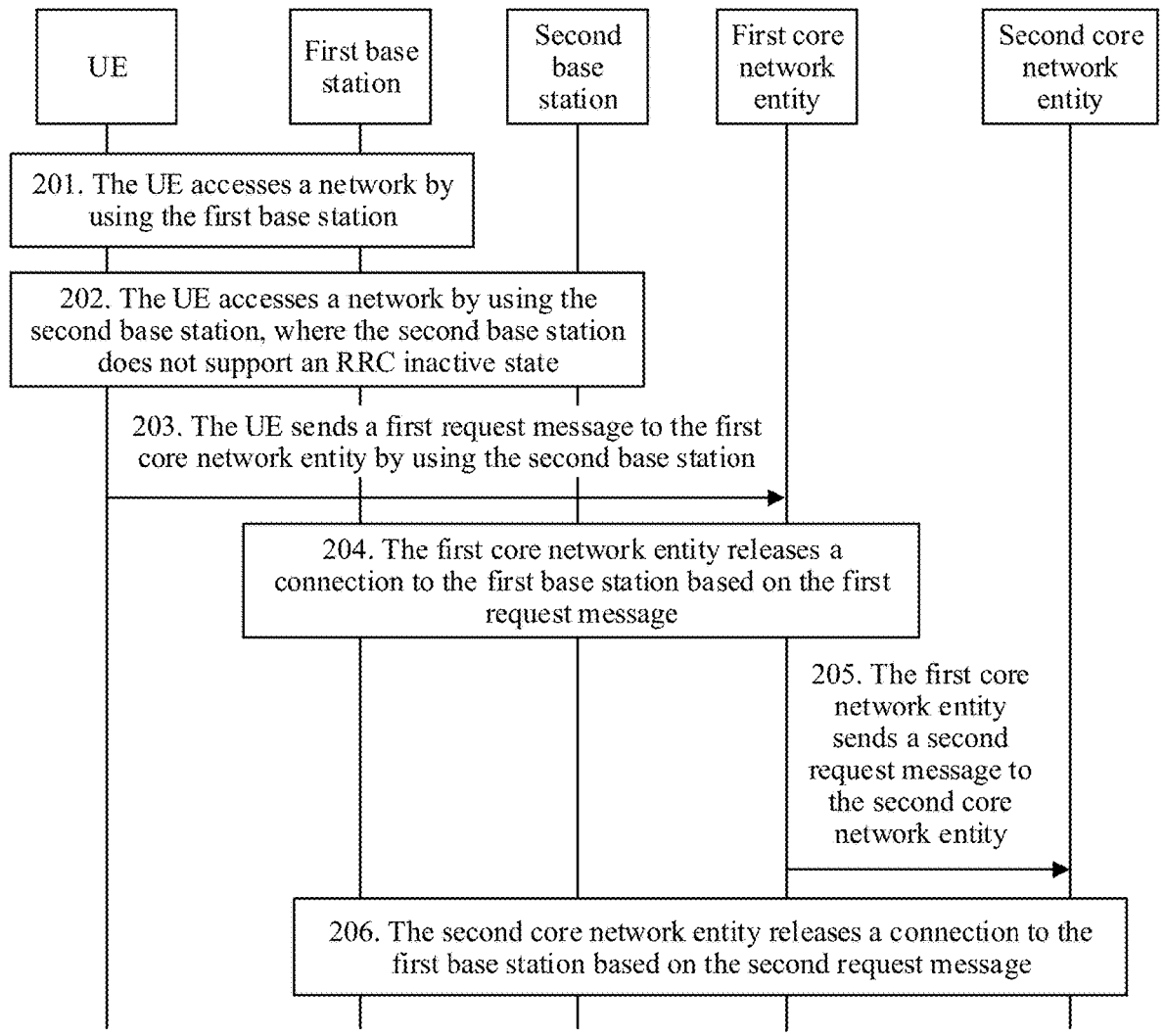
FIG. 2 is a schematic interaction diagram of a connection management method according to an embodiment of the present invention.

FIG. 2 is a schematic interaction diagram of a connection management method according to an embodiment of the present invention. Specifically, as shown in FIG. 2, the connection management method in this embodiment of the present invention may include the following operations.

Operation 201. UE accesses a network by using a first base station.

Operation 202. The UE accesses a network by using a second base station, where the second base station does not support an RRC inactive state.

Specifically, the UE may separately establish a connection to the first base station and a connection to the second base station. The first base station may be a base station corresponding to a RAN accessed by the UE before the UE moves, and the second base station may be a base station corresponding to a RAN accessed by the UE after the UE moves. The UE is UE that supports the RRC inactive state. For example, when communicating with the first base station, the UE may be in the RRC inactive state.

Operation 203. The UE sends a first request message to a first core network entity by using the second base station.

In one embodiment, the second base station may send a broadcast message to the UE to notify the UE whether the second base station supports the RRC inactive state. Therefore, the UE may determine, based on the broadcast message, whether the second base station supports the RRC inactive state, and further send, when determining that the second base station does not support the RRC inactive state, a request message to a core network entity such as an MME or an AMF, so that the core network entity releases a connection to the first base station based on the request message. Specifically, in some scenarios, for example, when a core network entity of the network accessed by the first base station is the same as a core network entity of the network accessed by the second base station, the UE may send the first request message to the first core network entity by using the second base station, and the first request message is used to trigger the first core network entity to release a connection to the first base station. That is, operation 203 and operation 204 are performed. Alternatively, in another scenario, for example, when a core network entity (that is, a second core network entity) of the network accessed by the first base station is different from a core network entity (that is, the first core network entity) of the network accessed by the second base station, the UE may send the first request message to the first core network entity by using the second base station, and send a second request message to the second core network device by using the first core network entity, and the second request message is used to trigger the second core network entity to release a connection to the first base station. That is, operation 203, operation 205, and operation 206 are performed.

Specifically, the broadcast message may include information indicating whether the second base station supports the RRC inactive state. For example, the broadcast message may include "0" or "1", where "0" is used to indicate that the second base station does not support the RRC inactive state, and "1" is used to indicate that the second base station supports the RRC inactive state. Alternatively, the broadcast message may directly carry capability information indicating that the second base station supports the RRC inactive state or that the second base station does not support the RRC inactive state. Alternatively, whether the second base station supports the RRC inactive state may be indicated in another manner. This is not limited in this application. Alternatively, In one embodiment, the broadcast message may further carry, only when the second base station supports the RRC inactive state, the capability information indicating that the second base station supports the RRC inactive state, and the broadcast message may not carry, when the second base station does not support the RRC inactive state, the capability information indicating whether the second base station supports the RRC inactive state. Therefore, after receiving the broadcast message sent by the second base station, the UE may determine, based on whether the broadcast message carries the capability information indicating whether the RRC inactive state is supported, whether the second base station supports the RRC inactive state. Specifically, when detecting that the broadcast message carries the capability information indicating that the second base station supports the RRC inactive state, the UE determines that the second base station supports the RRC inactive state, and when detecting that the broadcast message does not carry the capability information indicating that the second base station does not support the RRC inactive state, the UE determines that the second base station does not support the RRC inactive state.

The request message such as the first request message may be used to instruct the first core network entity to release the connection to the first base station, so that the first core network entity can release, when receiving the first request message, the connection to the first base station in time. The second request message may be used to instruct the second core network entity to release the connection to the first base station, so that the second core network entity can release, when receiving the second request message, the connection to the first base station in time.

In one embodiment, the first request message may be a location update request such as a TAU request, an attach request attach request, a registration request registration request, or a service request service request.

Operation 204. The first core network entity releases the connection to the first base station based on the first request message.

Operation 205. The first core network entity sends the second request message to the second core network entity.

Operation 206. The second core network entity releases the connection to the first base station based on the second request message.

In one embodiment, before sending the request message to the core network entity by using the second base station, the UE may switch a state of the UE from the RRC inactive state to an idle state, that is, the UE performs status switching. Specifically, when the status switching is performed, an RRC layer may notify a non-access stratum (NAS) of switching the state from the RRC inactive state to the idle state.

In one embodiment, the UE is in the RRC inactive state, and the first request message is a request message triggered by the broadcast message, such as the location update request, the attach request, the registration request, or the service request. That is, after receiving the broadcast message and determining that the second base station does not support the RRC inactive state, the UE may still maintain the RRC inactive state, but may trigger, based on the broadcast message, to execute the first request message in the idle state, such as the location update request, the attach request, the registration request, or the service request, instead of sending an RRC resume request in the RRC inactive state. In this way, it can be ensured that the network side identifies the first request message, and further releases the connection to the first base station.

Further, in one embodiment, the first request message may include indication information, and the indication information may be used to instruct the UE to switch from the RRC inactive state to the idle state idle state, so that the core network entity may determine, when receiving the first request message including the indication information, to release the connection to the first base station.

Further, in one embodiment, the first request message and/or the second request message may be further used to instruct the core network entity to perform a PDU session deactivation procedure. Specifically, after receiving the first request message, the first core network entity may further perform the PDU session deactivation procedure. For example, the first core network entity may release a connection to an SMF. Alternatively, after the second core network entity receives the second request message sent by the first core network entity, the second core network entity may further perform the PDU session deactivation procedure. Specifically, when the second core network entity such as an AMF performs the PDU session deactivation procedure, the AMF may send a session management context update request such as Nsmf_PDUSession_UpdateSMContext to an SMF, so that the SMF may initiate the PDU session deactivation procedure and the like to complete release of an N3 connection.

In one embodiment, the first request message may further include UE capability information, and the UE capability information may indicate that the UE supports the RRC inactive state. That is, the first request message may further carry the capability information indicating that the UE supports the RRC inactive state.

In one embodiment, the first base station may support the RRC inactive state. That is, this application is also applicable to a scenario in which the UE moves from a RAN that supports the RRC inactive state (that is, a network in which the first base station that supports the RRC inactive state is located) to a RAN that does not support the RRC inactive state (that is, a network in which the second base station that does not support the RRC inactive state is located).

Further, in one embodiment, the released connection may include an N2 and/or N3 connection between the core network entity and the first base station, and the like. Specifically, that the core network entity (for example, the first core network entity or the second core network entity) releases the connection to the first base station may include one or more of the following: deleting a UE context in the first base station, releasing an N2 connection between the core network entity and the RAN in which the first base station is located, releasing a context of the first base station in a UPF, releasing an N3 connection between the UPF and the first base station, and deactivating a PDU session, and the like.

Specifically, if a core network entity corresponding to the first base station is the same as a core network entity corresponding to the second base station, a core network entity that communicates with the UE before the UE moves is a core network entity that communicates with the UE after the UE moves. In this case, the UE may send a request message to the core network entity such as an AMF to trigger to release the connection to the first base station, and the AMF sends a session management context update request such as Nsmf_PDUSession_UpdateSMContext to an SMF, so that the SMF may initiate a PDU session deactivation procedure and the like to complete release of the N3 connection. Further, in one embodiment, the core network entity such as an AMF may further send an N2 UE context release command to the first base station. Further, the core network entity may further send a location update reception response to the UE. Further, in one embodiment, the core network entity may further send an N2 request to the second base station, and the N2 request may carry information such as a service accept message. Further, in one embodiment, the second base station may further add the service accept message to an RRC connection reconfiguration request, and send the RRC connection reconfiguration request to the UE.

Alternatively, if a core network entity corresponding to the first base station is different from a core network entity corresponding to the second base station, a core network entity that communicates with the UE before the UE moves is not a core network entity that communicates with the UE after the UE moves. That is, when the first core network entity and the second core network entity exist, the UE may send the first request message to the first core network entity, and the first core network entity sends the second request message such as a context request message or a context transfer message to the second core network entity, so that the second core network entity triggers to release the connection to the first base station and execute the PDU session deactivation procedure, and the like. In one embodiment, the second core network entity such as an AMF may trigger to release an N2 connection to the first base station, and the AMF sends a session management context update request such as Nsmf_PDUSession_UpdateSMContext to an SMF, and the SMF initiates deactivating a PDU session, that is, performing a PDU session deactivation procedure to complete release of the N3 connection. Further, in one embodiment, the second core network entity may further send an N2 UE context release command to the first base station. Further, the first core network entity may further send a location update reception response to the UE. Further, in one embodiment, the first core network entity may further send an N2 request to the second base station, and the N2 request may carry information such as a service accept message. Further, in one embodiment, the second base station may further add the service accept message to an RRC connection reconfiguration request, and send the RRC connection reconfiguration request to the UE.

Specifically, a sequence of sending the location update receiving response, releasing the connection to the first base station, performing the PDU session deactivation procedure, and sending information such as the N2 UE context release command is not limited, and they may be executed at the same time or not. This is not limited in this application.

In this embodiment of the present invention, the UE may access the network by using the first base station. In this case, the UE may be in the RRC inactive state. Further, the UE may also access the network by using the second base station. For example, if the UE moves from a cell in which the first base station is located to a cell in which the second base station is located, the UE may send the request message to the core network entity after determining that the second base station does not support the RRC inactive state, so that the core network entity can release the connection to the first base station after receiving the request message. In this way, communication is implemented between the UE in the RRC inactive state and the base station that does not support the RRC inactive state.

Figure 3:
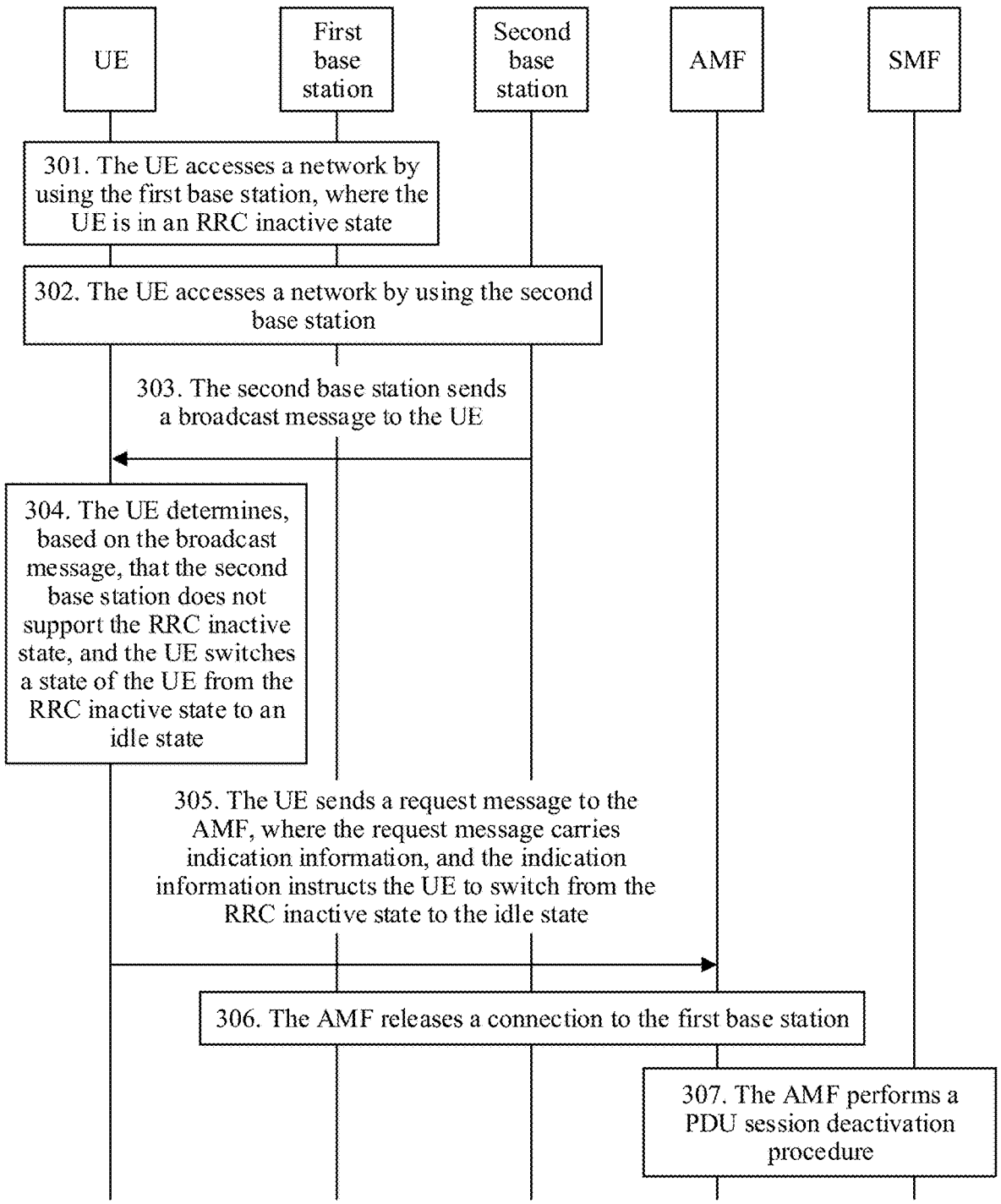
FIG. 3 is a schematic interaction diagram of another connection management method according to an embodiment of the present invention.

FIG. 3 is a schematic interaction diagram of another connection management method according to an embodiment of the present invention. Specifically, as shown in FIG. 3, the connection management method in this embodiment of the present invention may include the following operations.

Operation 301. UE accesses a network by using the first base station, where the UE is in an RRC inactive state.

Operation 302. The UE accesses a network by using a second base station.

The UE may be in the RRC inactive state. In one embodiment, the first base station may be a base station that supports the RRC inactive state.

Operation 303. The second base station sends a broadcast message to the UE.

Specifically, in some cases, the UE may need to be handed over from a RAN in which the first base station is located to a RAN in which the second base station is located. For example, when the UE moves, the first base station is a base station corresponding to the RAN before the UE moves, and the second base station is a base station corresponding to the RAN after the UE moves. The broadcast message may be used to indicate whether the second base station supports the RRC inactive state. In this embodiment of the present invention, it is assumed that the broadcast message indicates that the second base station does not support the RRC inactive state.

Operation 304. The UE determines, based on the broadcast message, that the second base station does not support the RRC inactive state, and the UE switches a state of the UE from the RRC inactive state to an idle state.

Operation 305. The UE sends a request message to an AMF, where the request message carries indication information, and the indication information is used to instruct the UE to switch from the RRC inactive state to the idle state.

Specifically, the UE may receive the broadcast message from the second base station. If determining, based on the broadcast message, that the second base station does not support the RRC inactive state, for example, the broadcast message does not carry capability information indicating that the second base station supports the RRC inactive state, the UE may switch the state of the UE from the RRC inactive state to the idle state, and then send the request message to a core network entity (that is, a first core network entity), for example, the AMF, the request message (that is, a first request message) such as a location update request, an attach request, a registration request, or a service request. The UE may send the request message to the second base station, and the second base station forwards the request message to the AMF. For example, after switching the RRC inactive state to the idle state, the UE may send a location update-based registration request such as the registration request to the second base station, and send the registration request to the AMF by using the second base station.

In one embodiment, the request message such as the registration request may include the indication information, and the indication information may be used to instruct the UE to switch from the RRC inactive state to the idle state, that is, the request message carries an indication indication of inactive→idle.

Further, in one embodiment, the request message such as the registration request may further include UE capability information, and the UE capability information may indicate that the UE supports the RRC inactive state. That is, the request message may further carry the capability information indicating that the UE supports the RRC inactive state. For example, the UE capability information may be carried in UE network capability in the request message.

Operation 306. The AMF releases a connection to the first base station.

Specifically, after receiving the request message such as the registration request, the AMF may release the connection to the first base station.

Operation 307. The AMF performs a PDU session deactivation procedure.

In one embodiment, the request message may be further used to instruct the AMF to perform the PDU session deactivation procedure. Therefore, when receiving the request message, the AMF may further perform the PDU session deactivation procedure, including releasing a connection between the AMF and an SMF. Further, the SMF may release a connection to a UPF.

In one embodiment, this embodiment of the present invention may be applied to a scenario in which the UE moves from a cell of a 5G base station (the first base station) that supports the RRC inactive state to a cell of a 5G base station (the second base station) that does not support the RRC inactive state. Specifically, an AMF corresponding to the first base station may be the same as or different from an AMF corresponding to the second base station. For a manner of sending a message and a manner of releasing a connection in the cases in which the AMFs are the same or different, refer to related descriptions in the embodiment shown in FIG. 2. Details are not described herein again.

In this embodiment of the present invention, after receiving the broadcast message sent by the second base station, and determining, based on the broadcast message, that the second base station does not support the RRC inactive state, the UE may switch the state of the UE from the RRC inactive state to the idle state, and send the request message to the AMF to instruct the AMF to release the connection to the first base station accessed by the UE before the UE moves. Therefore, after receiving the request message, the AMF releases the connection to the first base station and another related connection. In this way, communication is implemented between the UE in the RRC inactive state and a base station that does not support the RRC inactive state.

Figure 4:
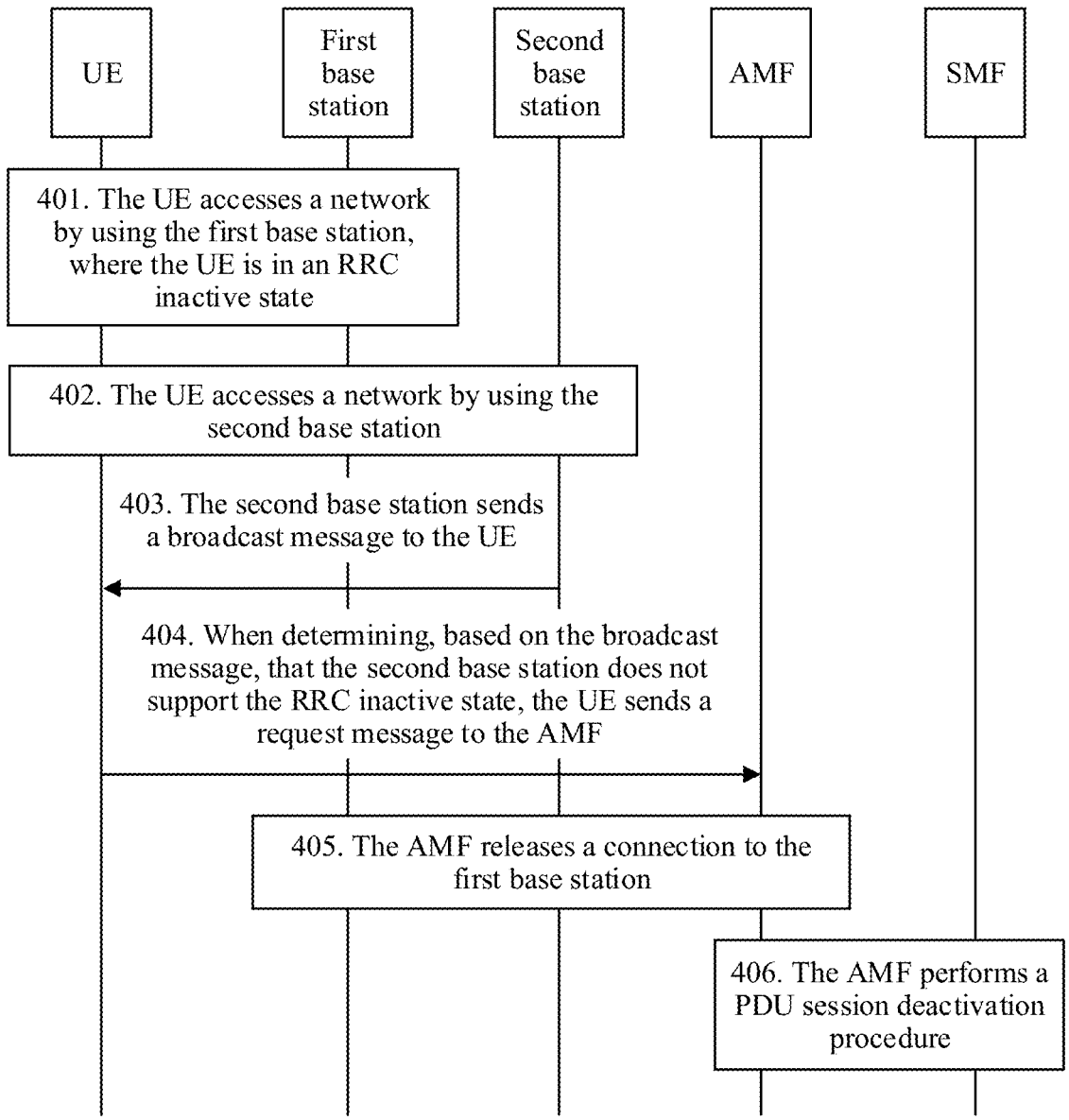
FIG. 4 is a schematic interaction diagram of still another connection management method according to an embodiment of the present invention.

FIG. 4 is a schematic interaction diagram of still another connection management method according to an embodiment of the present invention. Specifically, as shown in FIG. 4, the connection management method in this embodiment of the present invention may include the following operations.

Operation 401. UE accesses a network by using a first base station, where the UE is in an RRC inactive state.

Operation 402. The UE accesses a network by using a second base station.

The first base station may be a base station that supports the RRC inactive state.

Operation 403. The second base station sends a broadcast message to the UE.

Specifically, for operation 401 to operation 403, refer to the descriptions of operation 301 to operation 303 in the embodiment shown in FIG. 3. Details are not described herein again.

Operation 404. When determining, based on the broadcast message, that the second base station does not support the RRC inactive state, the UE sends a request message to an AMF.

Specifically, the UE may receive the broadcast message from the second base station. If determining, based on the broadcast message, that the second base station does not support the RRC inactive state, for example, the broadcast message does not carry capability information indicating that the second base station supports the RRC inactive state, the UE may switch a state of the UE from the RRC inactive state to an idle state, and then send the request message to a core network entity (that is, a first core network entity), for example, the AMF, the request message (that is, a first request message) such as a location update request, an attach request, a registration request, or a service request. The UE may send the request message to the second base station, and the second base station forwards the request message to the AMF. For example, the UE may send a location update-based registration request such as the registration request to the second base station, and send the registration request to the AMF by using the second base station.

In one embodiment, the request message such as the registration request may include indication information, and the indication information may be used to instruct the UE to switch from the RRC inactive state to the idle state, that is, the request message carries an indication of inactive→idle.

Further, in one embodiment, the request message such as the registration request may further include UE capability information, and the UE capability information may indicate that the UE supports the RRC inactive state. That is, the request message may further carry capability information indicating that the UE supports the RRC inactive state. For example, the UE capability information may be carried in UE network capability in the request message.

Operation 405. The AMF releases a connection to the first base station.

Specifically, after receiving the request message such as the registration request, the AMF may release the connection to the first base station.

Operation 406. The AMF performs a PDU session deactivation procedure.

In one embodiment, the request message may be further used to instruct the AMF to perform the PDU session deactivation procedure. Therefore, when receiving the request message, the AMF may further perform the PDU session deactivation procedure, including releasing a connection to an SMF. Further, the SMF may further release a connection to a UPF.

Specifically, an AMF corresponding to the first base station may be the same as or different from an AMF corresponding to the second base station. For a manner of sending a message and a manner of releasing a connection in the cases in which the AMFs are the same or different, refer to related descriptions in the embodiment shown in FIG. 2. Details are not described herein again.

Further, in one embodiment, after sending the request message to the AMF, the UE may further switch the state of the UE from the RRC inactive state to the idle state to communicate with the second base station that does not support the RRC inactive state.

In this embodiment of the present invention, when the UE in the RRC inactive state receives the broadcast message sent by the second base station, and determines, based on the broadcast message, that the second base station does not support the RRC inactive state, the broadcast message triggers to send the request message such as the registration request or the service request to the AMF. Therefore, after receiving the request message, the AMF can release the connection to the first base station and another related connection. In this way, communication is implemented between the UE in the RRC inactive state and a RAN that does not support the RRC inactive state.

Figure 5:
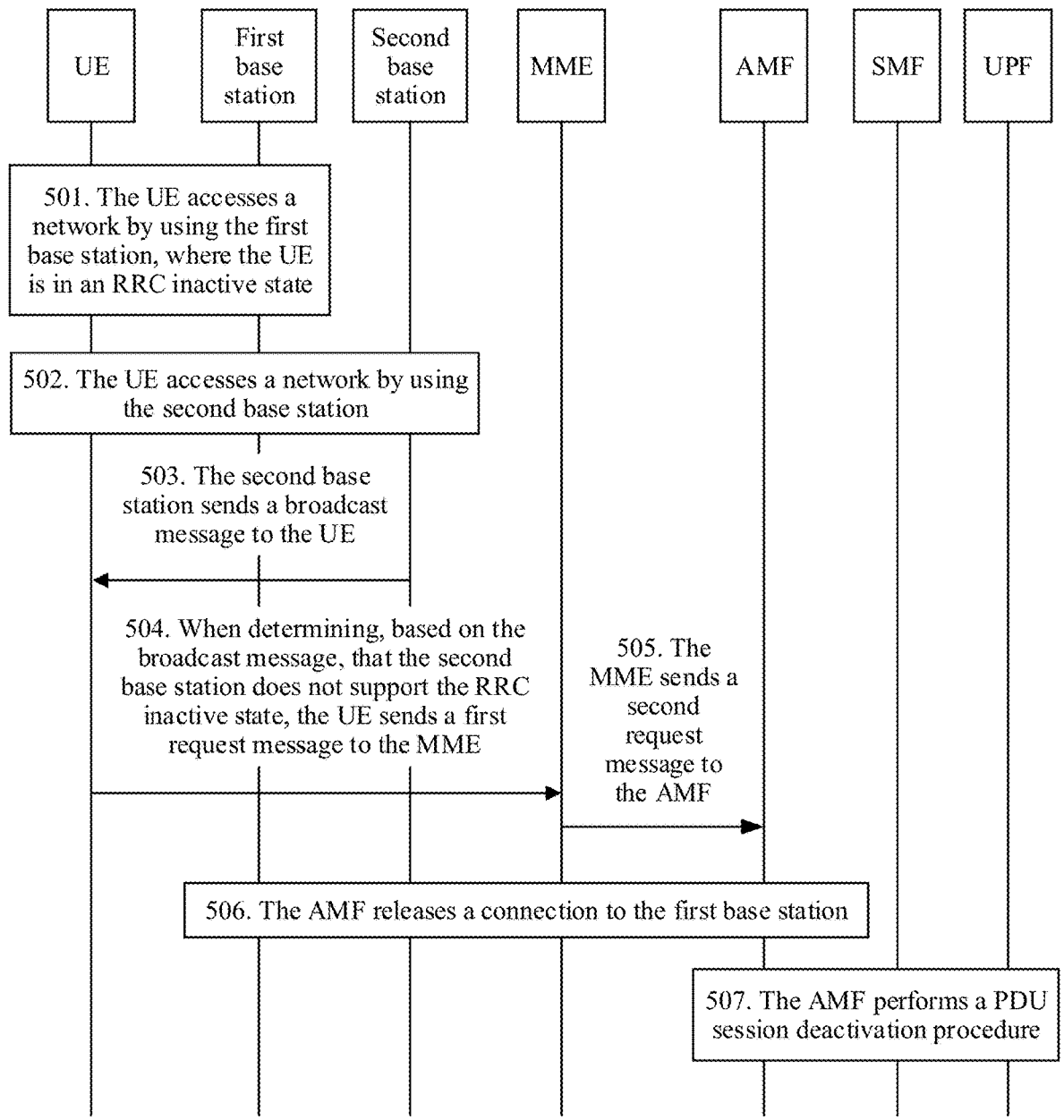
FIG. 5 is a schematic interaction diagram of still another connection management method according to an embodiment of the present invention.

FIG. 5 is a schematic interaction diagram of still another connection management method according to an embodiment of the present invention. Specifically, as shown in FIG. 5, the connection management method in this embodiment of the present invention may include the following operations.

Operation 501. UE accesses a network by using a first base station, where the UE is in an RRC inactive state.

Operation 502. The UE accesses a network by using a second base station.

Operation 503. The second base station sends a broadcast message to the UE.

Specifically, for operation 501 to operation 503, refer to the descriptions of operation 301 to operation 303 in the embodiment shown in FIG. 3. Details are not described herein again.

Operation 504. When determining, based on the broadcast message, that the second base station does not support the RRC inactive state, the UE sends a first request message to an MME.

Operation 505. The MME sends a second request message to an AMF.

Operation 506. The AMF releases a connection to the first base station.

Operation 507. The AMF performs a PDU session deactivation procedure.

In one embodiment, this embodiment of the present invention may be applied to a scenario in which the UE moves from a cell of a 5G base station, that is, the first base station, that supports the RRC inactive state to a cell of a 4G base station, that is, the second base station, that does not support the RRC inactive state. The UE may receive the broadcast message from the second base station, and may send the request message (that is, a first request message) such as a location update request, an attach request, a registration request, or a service request to a 4G core network entity MME (the first core network entity) by using the second base station when determining, based on the broadcast message, that the second base station does not support the RRC inactive state. For example, the UE may send the location update request such as a TAU request or the attach request attach request to the MME by using the second base station. Further, after receiving the TAU request or the attach request, the MME may further send the second request message such as the context request to the AMF (a second core network entity). Further, when receiving the context request, the AMF may trigger to release the connection between the AMF and the first base station, and performing the PDU session deactivation procedure, and the like.

In one embodiment, in another scenario, for example, in a scenario in which the UE moves from a cell of a 5G base station, that is, the first base station, that supports the RRC inactive state to a cell of a 5G base station, that is, the second base station, that does not support the RRC inactive state, and an AMF corresponding to the first base station is different from an AMF corresponding to the second base station, the UE may send the first request message to the AMF (a new AMF, that is, the first core network entity) corresponding to the second base station. The new AMF sends the second request message such as a context transfer message to the AMF (an old AMF, that is, the second core network entity) corresponding to the first base station, so that the old AMF may release a connection to the first base station. A release process is similar to the process of releasing a connection in the foregoing scenario, and details are not described herein again.

The foregoing method embodiments are example descriptions of the connection management method in this application. Each embodiment is described with emphasis. For a part that is not described in detail in an embodiment, refer to related descriptions in other embodiments.

Figure 6:
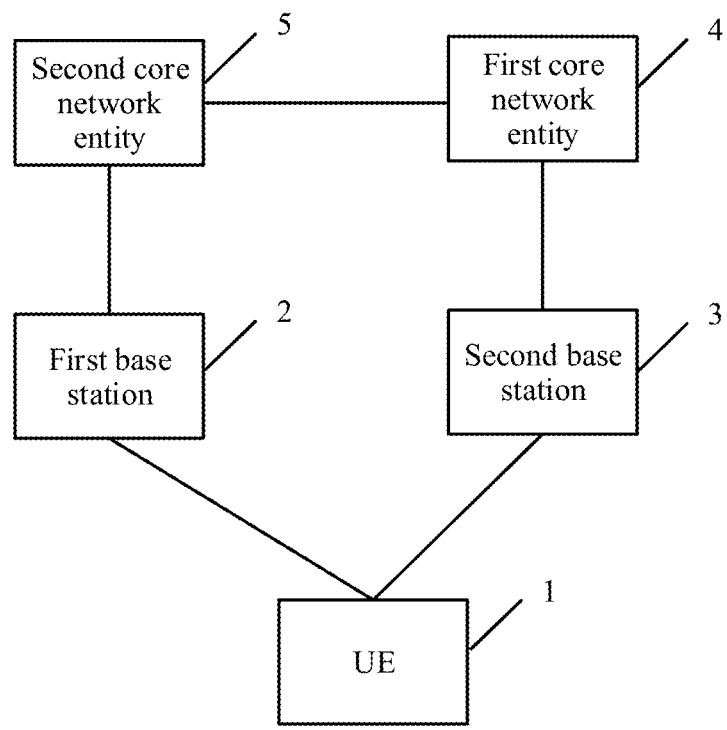
FIG. 6 is a schematic structural diagram of a connection management system according to an embodiment of the present invention.

FIG. 6 is a schematic structural diagram of a connection management system according to an embodiment of the present invention. As shown in FIG. 6, the connection management system in this embodiment of the present invention includes UE 1, a first base station 2, a second base station 3, a first core network entity 4, and a second core network entity 5.

The UE 1 can be configured to: access a network by using the first base station 2, where the UE 1 is in a radio resource connection inactive state RRC inactive state; access a network by using the second base station 3, where the second base station 3 does not support the RRC inactive state; and send a first request message to the first core network entity 4 by using the second base station 3.

The first core network entity 4 can be configured to: connect to the first base station 2; receive the first request message sent by the UE 1 by using the second base station 3, where the second base station 3 does not support the RRC inactive state; and release the connection to the first base station 2.

The second core network entity 5 can be configured to: connect to the first base station 2; receive a second request message sent by the second core network entity 4, where the second request message is sent by the first core network entity 4 to the second core network entity 5 when the first core network entity 4 receives the first request message sent by the UE by using the second base station 3, and the second base station 3 does not support the RRC inactive state; and release the connection to the first base station 2.

In one embodiment, the first base station 2 may be a base station corresponding to the network accessed by the UE before the UE moves, and the second base station 3 may be a base station corresponding to the network accessed by the UE after the UE moves. For the UE, the first base station, the second base station, the first core network entity, and the second core network entity in the embodiments of the present invention, refer to related descriptions in the embodiments shown in FIG. 2 to FIG. 5. Details are not described herein again.

Figure 7:
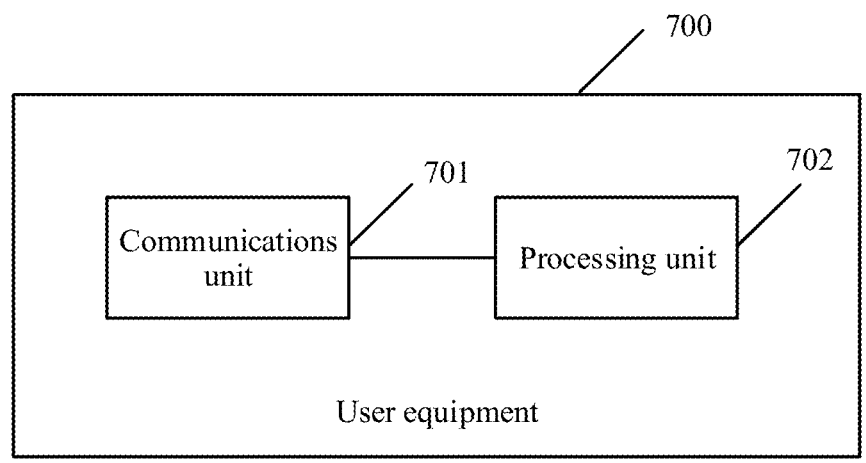
FIG. 7 is a schematic structural diagram of user equipment according to an embodiment of the present invention.

FIG. 7 is a possible schematic structural diagram of the user equipment according to some embodiments. As shown in FIG. 7, user equipment 700 may include a communications unit 701 and a processing unit 702. These units may perform corresponding functions of the UE in the foregoing method example. For example, the communications unit 701 is configured to access a network by using a first base station, where the user equipment UE is in a radio resource connection inactive state RRC inactive state. The communications unit 701 is further configured to access a network by using a second base station, where the second base station does not support the RRC inactive state. The communications unit 701 is further configured to send a first request message to a first core network entity by using the second base station, so that the first core network entity releases a connection to the first base station based on the first request message, or so that the first core network entity sends a second request message to a second core network entity, and the second core network entity releases a connection to the first base station based on the second request message. Further, the communications unit 701 is configured to receive a broadcast message sent by the second base station; and the processing unit 702 is configured to determine, based on the broadcast message, whether the second base station supports the RRC inactive state. Further, the communications unit 701 may send the request message to the core network entity by using the second base station when the processing unit 702 determines that the second base station does not support the RRC inactive state.

In one embodiment, the first base station is a base station corresponding to the network accessed by the UE before the UE moves, and the second base station is a base station corresponding to the network accessed by the UE after the UE moves.

In one embodiment, the first core network entity may be a core network entity of the network accessed by the second base station, and the second core network entity may be a core network entity of the network accessed by the first base station.

In one embodiment, the processing unit 701 may be further configured to switch a state of the UE from the RRC inactive state to an idle state idle state.

In one embodiment, the first request message may include indication information, and the indication information may be used to instruct the UE to switch from the RRC inactive state to the idle state idle state.

In one embodiment, the first request message may be a location update request, an attach request, a registration request, or a service request.

In one embodiment, the first request message further includes UE capability information, and the UE capability information indicates that the UE supports the RRC inactive state.

In one embodiment, the first base station supports the RRC inactive state.

In one embodiment, the first core network entity may be an MME, an AMF, an SGSN, or the like, and the second core network entity may be an AMF.

It should be noted that, in the embodiments of the present invention, unit division is an example, and is merely logical function division. In actual implementation, another division manner may be used. Functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

Figure 8:
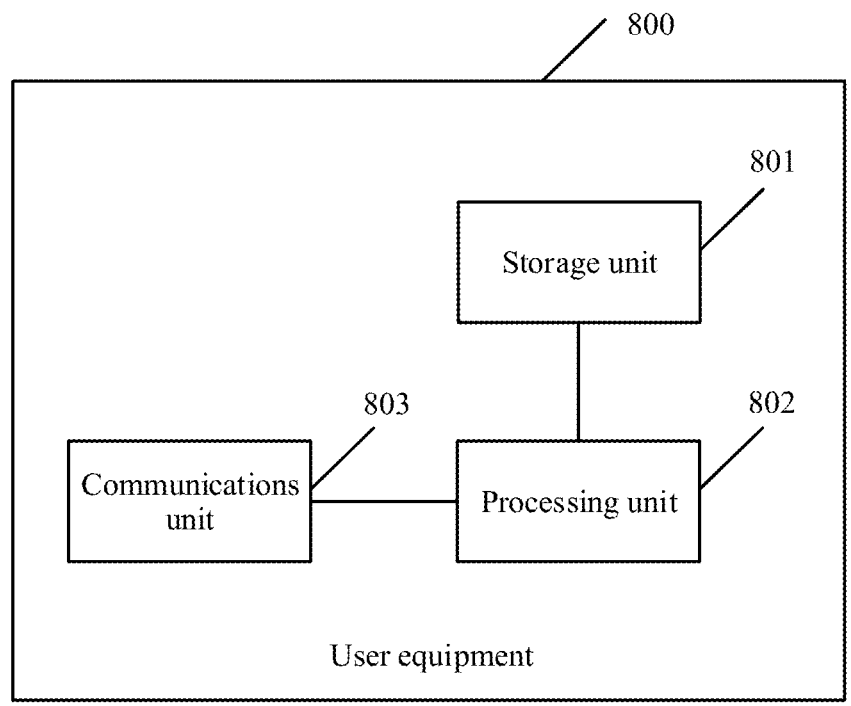
FIG. 8 is a schematic structural diagram of another user equipment according to an embodiment of the present invention.

When the integrated unit is used, FIG. 8 is another possible schematic structural diagram of the user equipment according to some embodiments. As shown in FIG. 8, the user equipment 800 may include a processing unit 802 and a communications unit 803. The processing unit 802 is configured to control and manage an action of the user equipment. For example, the processing unit 802 is configured to support the user equipment in performing operation 304 in FIG. 3 and/or another process of the technology described in this specification. The communications unit 803 is configured to support the user equipment in communicating with other network entities such as the functional units or the network entities shown in FIG. 2 to FIG. 5. The user equipment may further include a storage unit 801, configured to store program code (an operation instruction) and data of the user equipment.

The processing unit 802 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications unit 803 may be a transceiver, and the storage unit 801 may be a memory.

Figure 9:
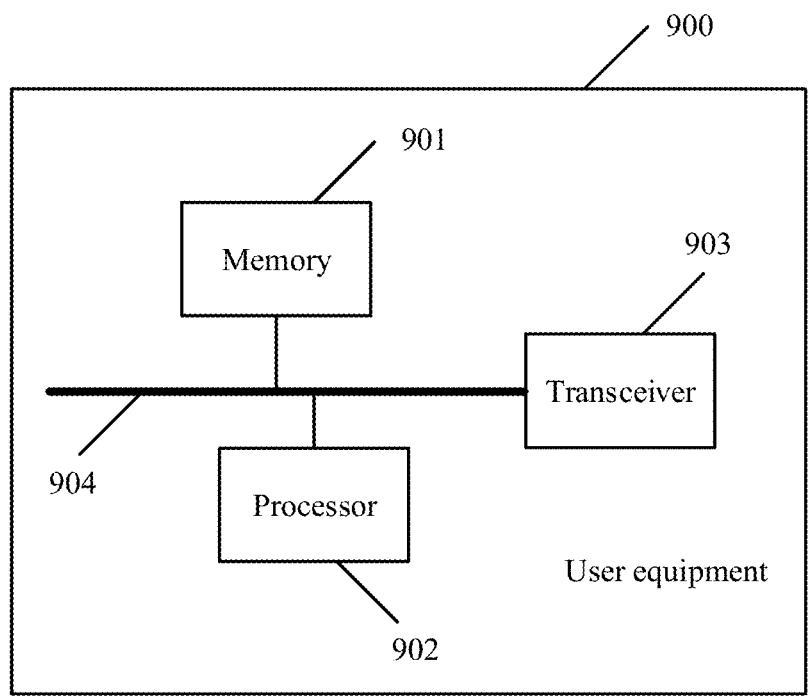
FIG. 9 is a schematic structural diagram of still another user equipment according to an embodiment of the present invention.

When the processing unit 802 is the processor, the communications unit 803 is the transceiver, and the storage unit 801 is the memory, the user equipment in this embodiment of the present invention may be user equipment shown in FIG. 9.

As shown in FIG. 9, the user equipment 900 may include a processor 902, a transceiver 903, a memory 901, and a bus 904. The transceiver 903, the processor 902, and the memory 901 are interconnected by using the bus 904. The bus 904 may be a peripheral component interconnect (PCI) bus, or an extended industry standard architecture (EISA) bus, or the like. The bus may be classified into an address bus, a data bus, and a control bus, and the like. For ease of representation, only one thick line is used to represent the bus in FIG. 9, but this does not mean that there is only one bus or only one type of bus.

Method or algorithm operations described in combination with the content disclosed in this application may be implemented by hardware, or may be implemented by a processor by executing a software instruction. The software instruction may include a corresponding software module or a corresponding unit. The software module or the unit may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may be in the user equipment as discrete components.

Figure 10:
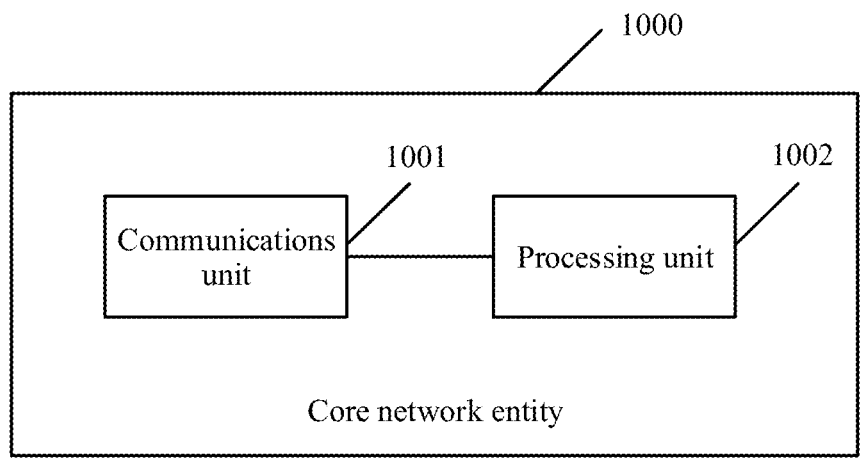
FIG. 10 is a schematic structural diagram of a core network entity according to an embodiment of the present invention.

FIG. 10 is a possible schematic structural diagram of the core network entity in the foregoing embodiments. As shown in FIG. 10, the core network entity 1000 may include a communications unit 1001 and a processing unit 1002. These units may perform corresponding functions of the core network entity such as the AMF in the foregoing method example. For example, the communications unit 1001 is configured to: connect to a first base station, where user equipment UE that accesses a network by using the first base station is in a radio resource connection inactive RRC inactive state. The communications unit 1001 is further configured to receive a first request message sent by the UE by using a second base station, or receive a second request message sent by another core network entity, where the second request message is sent by the another core network entity to the core network entity when the another core network entity receives the first request message that is sent by the UE by using the second base station, and the second base station does not support the RRC inactive state. The processing unit 1002 is configured to invoke the communications unit 1001 to release a connection to the first base station.

In one embodiment, the first base station may be a base station corresponding to the network accessed by the UE before the UE moves, and the second base station may be a base station corresponding to the network accessed by the UE after the UE moves.

In one embodiment, the first request message includes indication information, and the indication information is used to instruct the UE to switch from the RRC inactive state to an idle state idle state.

In one embodiment, the processing unit 1002 is further configured to invoke the communications unit 1001 to perform a protocol data unit session deactivation procedure PDU session deactivation procedure.

In one embodiment, the first request message is a location update request, an attach request, a registration request, or a service request.

In one embodiment, the first request message further includes UE capability information, and the UE capability information indicates that the UE supports the RRC inactive state.

In one embodiment, the first base station supports the RRC inactive state.

In one embodiment, the first core network entity may be an MME, an AMF, an SGSN, or the like, and the second core network entity may be an AMF.

It should be noted that, in the embodiments of the present invention, unit division is an example, and is merely logical function division. In actual implementation, another division manner may be used. Functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

Figure 11:
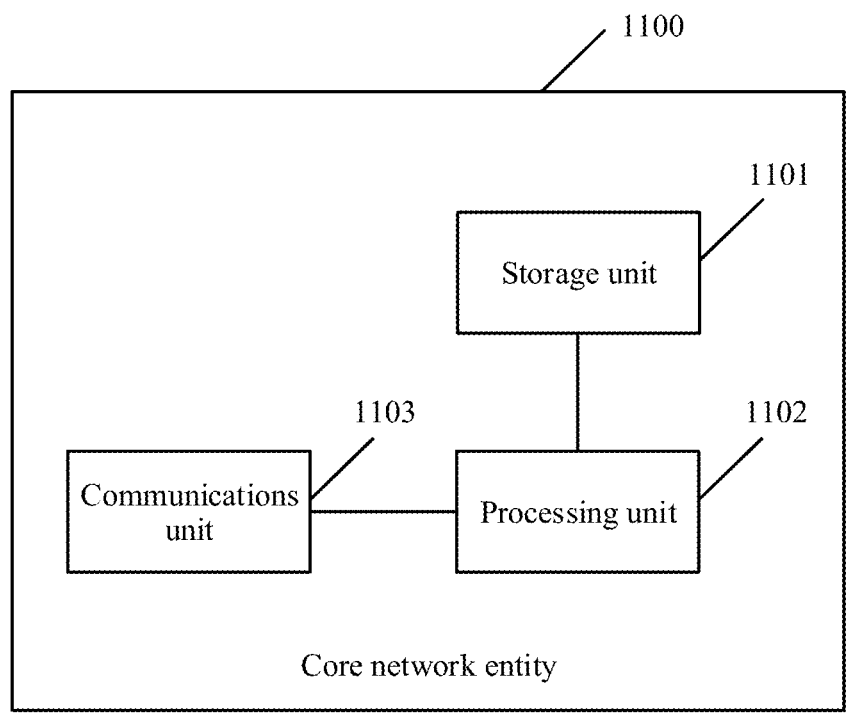
FIG. 11 is a schematic structural diagram of another core network entity according to an embodiment of the present invention.

When the integrated unit is used, FIG. 11 is another possible schematic structural diagram of the core network entity in the foregoing embodiments. As shown in FIG. 11, the core network entity 1100 may include a processing unit 1102 and a communications unit 1103. The processing unit 1102 may be configured to control and manage an action of the core network entity. For example, the processing unit 1102 is configured to support the core network entity in performing operation 306 and operation 307 in FIG. 3, and operation 405 and operation 406 in FIG. 4, and/or another process of the technology described in this specification. The communications unit 1103 is configured to support the core network entity in communicating with other network entities such as the functional units or the network entities shown in FIG. 2 to FIG. 5. The core network entity may further include a storage unit 1101, configured to store program code (an operation instruction) and data of the core network entity.

The processing unit 1102 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications unit 1103 may be a transceiver. The storage unit 1101 may be a memory.

Figure 12:
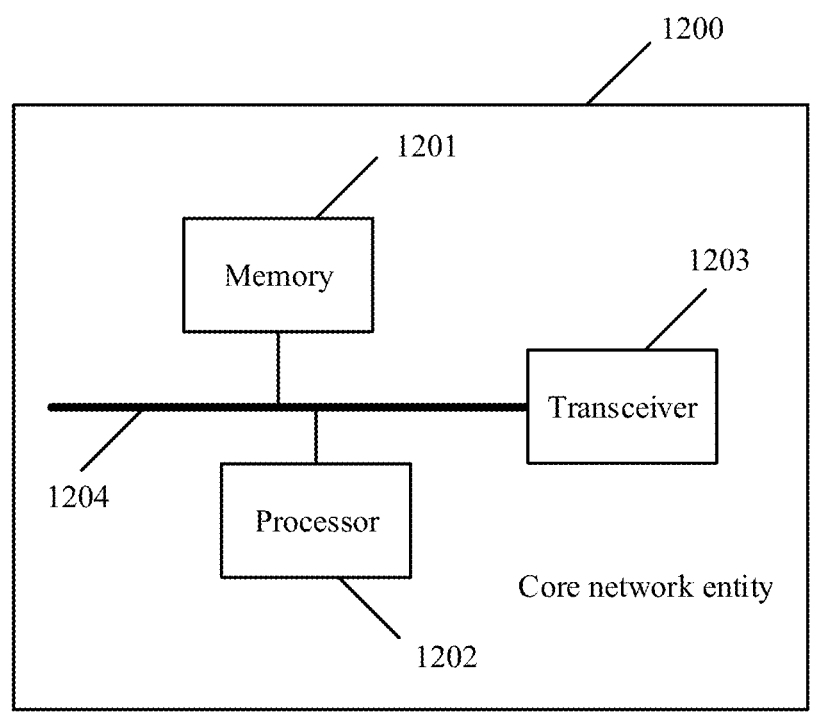
FIG. 12 is a schematic structural diagram of still another core network entity according to an embodiment of the present invention.

When the processing unit 1102 is the processor, the communications unit 1103 is the transceiver, and the storage unit 1101 is the memory, the core network entity in this embodiment of the present invention may be a core network entity shown in FIG. 12.

Referring to FIG. 12, the core network entity 1200 may include a processor 1202, a transceiver 1203, a memory 1201, and a bus 1204. The transceiver 1203, the processor 1202, and the memory 1201 are interconnected by using the bus 1204. The bus 1204 may be a peripheral component interconnect (PCI) bus, or an extended industry standard architecture (EISA) bus, or the like. The bus may be classified into an address bus, a data bus, and a control bus, and the like. For ease of representation, only one thick line is used to represent the bus in FIG. 12, but this does not mean that there is only one bus or only one type of bus.

Method or algorithm operations described in combination with the content disclosed in this application may be implemented by hardware, or may be implemented by a processor by executing a software instruction. The software instruction may include a corresponding software module or a corresponding unit. The software module or the unit may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the core network entity. Certainly, the processor and the storage medium may be in the core network entity as discrete components.

In an implementation process, operations in the foregoing methods can be implemented by using a hardware integrated logical circuit in the processor, or by using instructions in a form of software. The operations of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with the hardware in the processor. To avoid repetition, details are not described herein again.

It should be further understood that first, second, third, fourth, and various numbers in this specification are merely used for differentiation for ease of description, and are not construed as any limitation on the scope of the embodiments of the present invention.

It should be understood that, the term "and/or" in this specification describes merely an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of the present invention.

A person of ordinary skill in the art may be aware that, in combination with illustrative logical blocks described in the embodiments disclosed in this specification and operations may be implemented by electronic hardware or a combination of computer software and electronic hardware. Whether the functions are performed by hardware or software depends on a particular application and a design constraint condition of the technical solution. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that, the disclosed system, apparatus, user equipment, core network entity, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual coupling or a direct coupling or a communication connection may be implemented through some interfaces. An indirect coupling or a communication connection between the apparatus or the unit may be implemented in an electronic form, a mechanical form, or in other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, the functional units in the embodiments of this application may be integrated into one processing unit, or each of the units may exist alone physically, or two or more units are integrated into one unit.

All or some of the foregoing embodiments may be implemented by using software, hardware, firmware, or a combination thereof. When the software is used to implement the embodiments, all or some of the embodiments may be implemented in a form of a computer program product. The computer program product includes one or more computer instructions. When the computer program instruction is loaded and executed on the computer, the procedures or the functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another web site, computer, server, or data center in a wired (for example, a coaxial cable, an optical fiber, or a digital subscriber line (DSL)) manner or a wireless (for example, infrared, radio, or microwave) manner. The computer-readable storage medium may be any usable medium accessible by a computer, or a data storage device, such as a server and a data center that are integrated by one or more usable media. The usable medium may be a magnetic medium (for example, a floppy disk, a hard disk, or a magnetic tape), an optical medium (for example, a DVD), or a semiconductor medium (for example, a solid-state disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A connection management method, comprising:
accessing, by user equipment (UE), a network by using a first base station, wherein the UE is in a radio resource connection (RRC) inactive state;
accessing, by the UE, a network by using a second base station, wherein the second base station does not support the RRC inactive state; and
sending, by the UE, a first request message to a first core network entity by using the second base station, so that the first core network entity releases a connection to the first base station based on the first request message;
wherein the first core network entity is a core network entity of the network accessed by the second base station, wherein the first request message further comprises UE capability information, and the UE capability information indicates that the UE supports the RRC inactive state.

2. The method according to claim 1, wherein before sending, by the UE, a first request message to a first core network entity by using the second base station, the method further comprises:
receiving, by the UE, a broadcast message sent by the second base station; and
determining, by the UE based on the broadcast message, that the second base station does not support the RRC inactive state.

3. The method according to claim 1, wherein the first base station is a base station corresponding to a network accessed by the UE before the UE moves, and the second base station is a base station corresponding to a network accessed by the UE after the UE moves.

4. The method according to claim 1, wherein before sending, by the UE, a first request message to a first core network entity by using the second base station, the method further comprises:
switching, by the UE, a state of the UE from the RRC inactive state to an idle state.

5. The method according to claim 1, wherein the first request message comprises indication information, and the indication information is used to instruct the UE to switch from the RRC inactive state to an idle state.

6. The method according to claim 1, wherein the first request message is a location update request, an attach request, a registration request, or a service request.

7. The method according to claim 1, wherein the first base station supports the RRC inactive state.

8. The method according to claim 1, wherein the first core network entity is a mobility management entity (MME), or an access and mobility management function entity (AMF).

9. A connection management method, comprising:
accessing, by UE, a network by using a first base station, wherein the UE is in a RRC inactive state;
accessing, by the UE, a network by using a second base station, wherein the second base station does not support the RRC inactive state; and
sending, by the UE, a first request message to a first core network entity by using the second base station, so that the first core network entity sends a second request message to a second core network entity, and the second core network entity releases a connection to the first base station based on the second request message;
wherein the first core network entity is a core network entity of the network accessed by the second base station, and the second core network entity is a core network entity of the network accessed by the first base station, wherein the first request message further comprises UE capability information, and the UE capability information indicates that the UE supports the RRC inactive state.

10. The method according to claim 9, wherein before sending, by the UE, a first request message to a first core network entity by using the second base station, the method further comprises:
receiving, by the UE, a broadcast message sent by the second base station; and
determining, by the UE based on the broadcast message, that the second base station does not support the RRC inactive state.

11. The method according to claim 9, wherein the first base station is a base station corresponding to a network accessed by the UE before the UE moves, and the second base station is a base station corresponding to a network accessed by the UE after the UE moves.

12. The method according to claim 9, wherein before sending, by the UE, a first request message to a first core network entity by using the second base station, the method further comprises:
switching, by the UE, a state of the UE from the RRC inactive state to an idle state.

13. The method according to claim 9, wherein the first request message comprises indication information, and the indication information is used to instruct the UE to switch from the RRC inactive state to an idle state.

14. The method according to claim 9, wherein the first core network entity is a MME, and the second core network entity is an AMF.

15. UE, comprising:
a non-transitory memory comprising instructions; and
a processor coupled to the non-transitory memory, the instructions being executed by the processor to cause the UE to:
access a network by using a first base station, wherein the UE is in a RRC inactive state;
access a network by using a second base station, wherein the second base station does not support the RRC inactive state; and
send a first request message to a first core network entity by using the second base station, so that the first core network entity releases a connection to the first base station based on the first request message;
wherein the first core network entity is a core network entity of the network accessed by the second base station, wherein the first request message further comprises UE capability information, and the UE capability information indicates that the UE supports the RRC inactive state.

16. The UE according to claim 15, the instructions further cause the UE to:
receive a broadcast message sent by the second base station; and
determine that the second base station does not support the RRC inactive state, based on the broadcast message.

17. The UE according to claim 15, the instructions further cause the UE to:
switch a state of the UE from the RRC inactive state to an idle state.

18. The UE according to claim 15, wherein the first request message further comprises UE capability information, and the UE capability information indicates that the UE supports the RRC inactive state.

* * * * *